Patented Sept. 19, 1922.

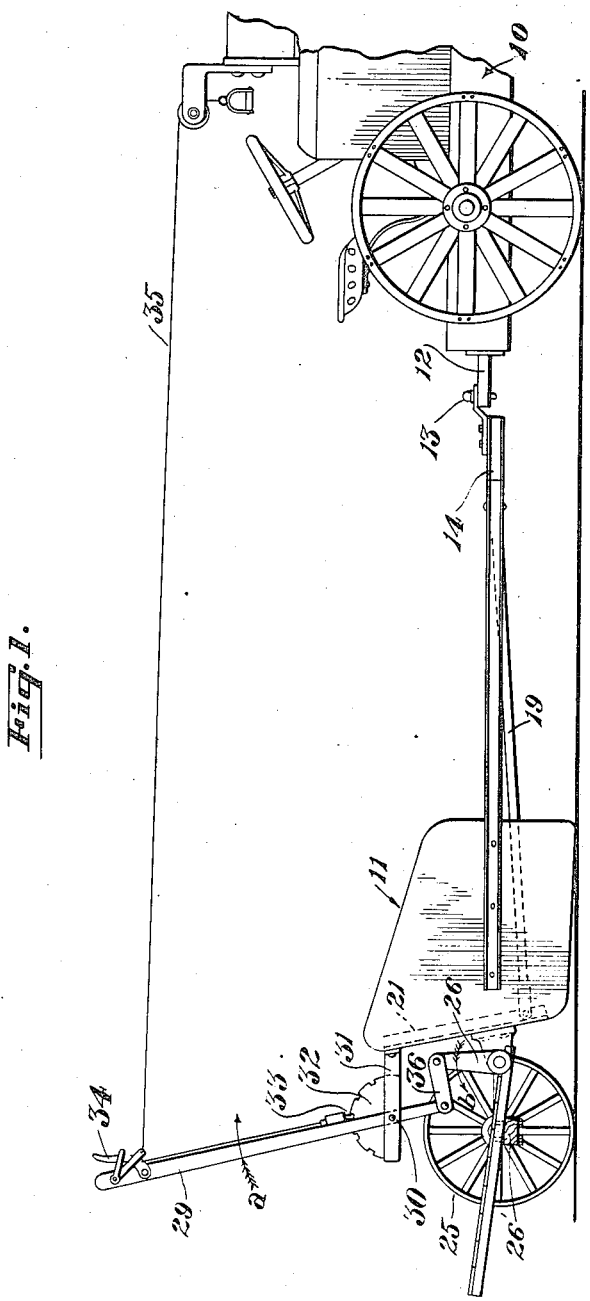

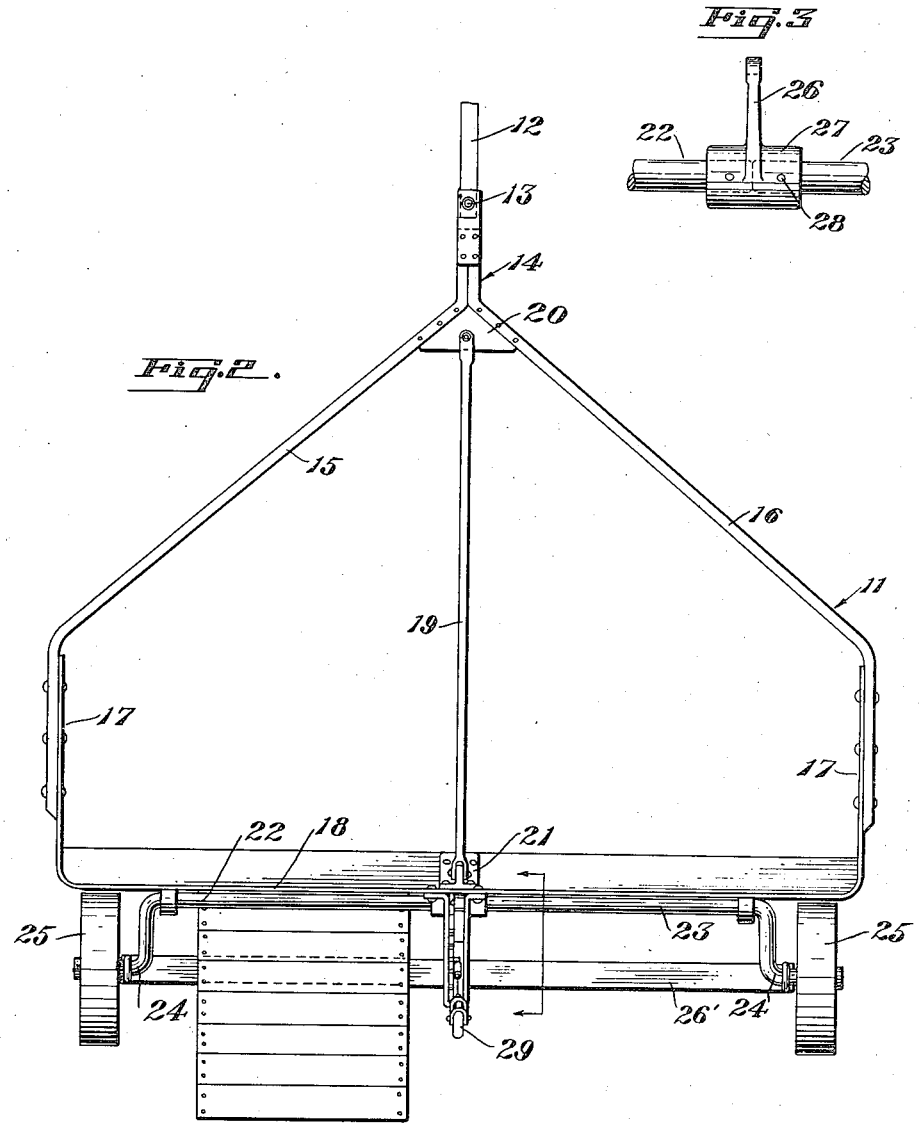

1,429,516

UNITED STATES PATENT OFFICE.

HARRY R. LYTLE, OF SACRAMENTO, CALIFORNIA.

LAND LEVELER.

Application filed August 4, 1920. Serial No. 401,097.

*To all whom it may concern:*

Be it known that I, HARRY R. LYTLE, a citizen of the United States, residing at Sacramento, in the county of Sacramento and State of California, have invented a new and useful Improvement in Land Levelers, of which the following is a specification.

This invention relates to an agricultural implement, and particularly pertains to a land leveler.

It is the principal object of the present invention to provide a land leveling device which is simple in construction and may be easily operated by a person riding upon the leveler or driving a tractor by which the leveler may be drawn, said operation permitting the leveler to be raised and lowered as desired.

The present invention contemplates the use of a leveling blade equipped with sideboards at its ends, and provided with a draw bar to be secured to a tractor, said leveling blade being secured to a running gear by which its elevation may be varied by a simple adjustment mechanism.

The invention is illustrated, by way of example, in the accompanying drawings, in which Figure 1 is a view in side elevation, disclosing the application in the present invention and its connection with a tractor. Figure 2 is a view in plan showing the complete land leveler. Figure 3 is a fragmentary view, disclosing the manner in which the lifting rods of the leveler are secured to the operating crank.

Referring more particularly to the drawings, 10 indicates the tractor of any suitable design, and to which a land leveler 11 is secured. The tractor is, of course, fitted with a draw bar 12, adapted to receive a coupling pin 13, which also passes through a tongue 14. This tongue is formed of two bars which extend outwardly and rearwardly, indicated at 15 and 16, and thereafter are bent parallel to each other to coincide with the outer faces of sideboards 17. These sideboards extend vertically and are preferably formed as continuations of a back plate 18, which constitutes the main blade of the leveler. This back plate extends substantially vertical and terminates a short distance above the ground, or a short distance above the lower edge of the sideboards 17. A central stay rod 19 is secured to a plate 20, at a juncture of the bars 15 and 16, and also to a rib 21 secured to the forward face of the blade 18.

This is intended to strengthen the blade and prevent it from yielding when it is being drawn against a large bulk of material.

Axle members 22 and 23 are disposed in the rear of the blade and are formed with crank shaped axle spindles 24. These spindles are in longitudinal line with each other, and opposite a considerable distance from the longitudinal center of the main axle lengths. Trailer wheels, 25, are mounted on these spindles. The spindles are rigidly tied together by an axle brace 26', clearly shown in Figure 2, while the axles themselves are tied together by the construction shown in Figure 3. Here it will be seen that a lever arm 26 is provided, having an enlarged bossed portion 27, into which the adjacent ends of the axles project and are secured by pins 28. It will thus be evident that rotation of the two axle members 23 and 24 may be readily produced by swinging the lever arm 26, and that when this lever is swung rearwardly from its normal vertical position its fulcrum will be elevated and the leveling blade lifted.

The mechanism for producing this swinging action comprises a hand lever 29 pivoted upon a pin 30 to a bracket 31. This bracket extends horizontally from the rear face of the leveler and carries a quadrant 32. The quadrant is provided with a plurality of notches in its circumferential face adapted to be separately engaged by a lock bolt 33, which may be retracted by the hand grip 34. This grip may also be operated by a cable 35 extending to some convenient point upon the tractor 10. The lower end of the hand lever 29 is fitted with a link 36 pivoted to the free end of the lever arm 26.

In operation of the present invention the land leveler may be secured to the draw bar of the tractor by the coupling pin 13, and if desired its blade may be allowed to freely rest upon the ground by permitting the lever arm 26 to swing to its extreme forward position. The leveling blade may be lifted as desired by swinging the hand lever 29 in the direction of the arrow —a—. This will swing the lever arm 26 rearwardly in the direction of the arrow —b—, and as this leveler is rigidly secured to both of the crank axles the axes of the spindles will become fulcrum points and the rotated axis of the crank lever 26 will therefore rise. This movement will lift the leveler blade an optionally determined height, after which the blade may be locked by the quadrant and the lock member 33.

It will thus be seen that the land leveler here disclosed is simple in operation and construction, and that suitable means are provided whereby the height of the lower edge of the leveler blade may be readily adjusted.

While I have shown the preferred form of my invention as now known to me, it will be understood that various changes might be made in the combination, construction and arrangement of parts by those skilled in the art without departing from the spirit of the invention as claimed.

Having thus described my invention, what I claim and desire to secure by Letters Patent is:—

1. A land leveler comprising a leveling blade, draft bars rigidly connected thereto, carrying wheels at the rear of the blade, a forwardly extending crank axle on the wheels pivotally connected to the rear of the blade and means for controlling the elevation of the blade comprising a rigid bracket on the rear of the blade, a lever fulcrumed intermediately on said bracket, a crank arm on the crank axle and a link pivotally connected to the crank arm and lever.

2. A land leveler comprising a leveling blade, draft bars rigidly connected thereto, carrying wheels at the rear of the blade, a forwardly extending crank axle on the wheels pivotally connected to the rear of the blade and means for controlling the elevation of the blade comprising a rigid bracket on the rear of the blade, a lever fulcrumed intermediately on said bracket, a crank arm on the crank axle, a link pivotally connected to the crank arm and lever, said connections being so arranged that a forward pull on the lever will raise the blade, and flexible connections extending forwardly from the lever to a draft vehicle for actuating said lever.

In testimony whereof I have hereunto set my hand in the presence of two subscribing witnesses.

HARRY R. LYTLE.

Witnesses:
LYNN S. ATKINSON, Jr.,
ADLER JONES.